FIG.4

United States Patent Office 2,969,554
Patented Jan. 31, 1961

2,969,554
MACHINE FOR SIMULTANEOUSLY PRESSING AND FORMING JOINTS IN THE HINGE AREAS OF CASED BOOKS

John O. McCahon, Crawfordsville, Ind., assignor to R. R. Donnelley & Sons Company, a corporation of Delaware Filed Sept. 27, 1956, Ser. No. 612,437

15 Claims. (Cl. 11—1)

This invention relates to a machine for pressing and forming the hinge joints in the bases of books.

The principal object of the invention is to provide a small, compact machine for pressing the cases of and forming the hinge joints in cased books.

A further object of the invention is to provide such a machine which is small enough that it may readily be moved into the operation of a small bindery.

Yet another object of the invention is to provide such a machine which is so organized that a single operator may feed books into the machine, control the operation of the case pressing and joint forming irons, and permit the books which have passed through the machine to move onto a conveyor or be stacked by hand for transfer to a packing table.

Yet another object of the invention is to provide a small, compact device of the character described in which adjustments of the mechanism for books of various sizes may be readily made.

Yet another object of the invention is to provide such a device in which the operation of the book pressing and joint forming irons is produced by a single pneumatic or hydraulic cylinder actuated by a manual control valve which produces sequential operation of said irons.

The invention is illustrated in a preferred embodiment in the accompanying drawings in which.

Referring to the drawings in greater detail, and referring first to Figs. 1–4, the present machine has a frame indicated generally at 20 which includes a pair of transverse lower frame members 21 connected by a pair of spaced longitudinal lower frame members 22a and 22b (Fig. 4), a pair of end frame plates 23, and a pair of upper longitudinal frame members 24a and 24b which are secured at their ends to the end plates 23. A pair of parallel, longitudinal intermediate frame members 27a and 27b (Fig. 4) are positioned directly above the longitudinal bottom frame members 22a and 22b. For easy mobility the frame 20 is preferably mounted on casters 25 and has manually adjustable jack screw supports 26 upon which it may be stably positioned when in use.

Adjustably mounted on the frame 20 for transverse and vertical movement is a pair of book supporting guide rails 28a and 28b, the adjusting mechanism for which will be described in more detail hereafter.

Figure 1:
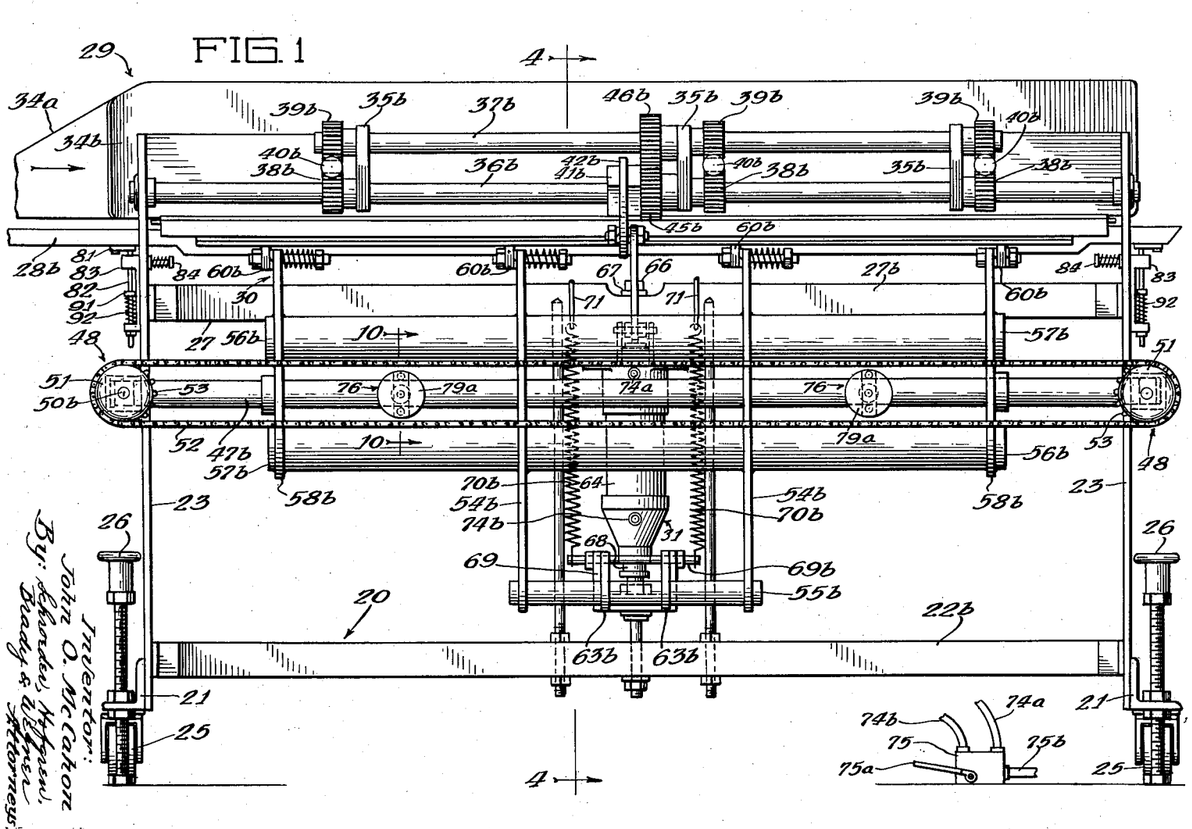
Fig. 1 is a side elevational view of a joint forming machine constructed in accordance with the present invention.
Figure 2:
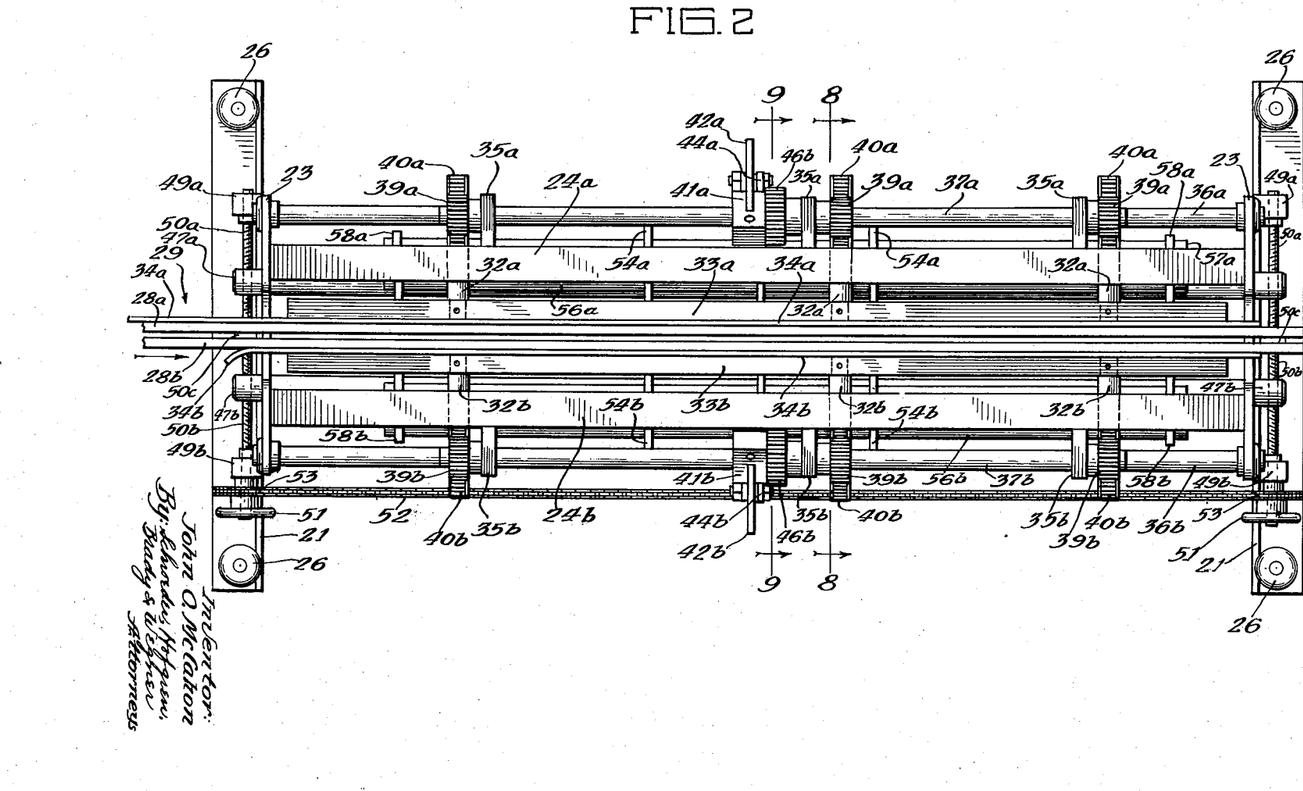
Fig. 2 is a plan view of such a machine.
Figure 3:
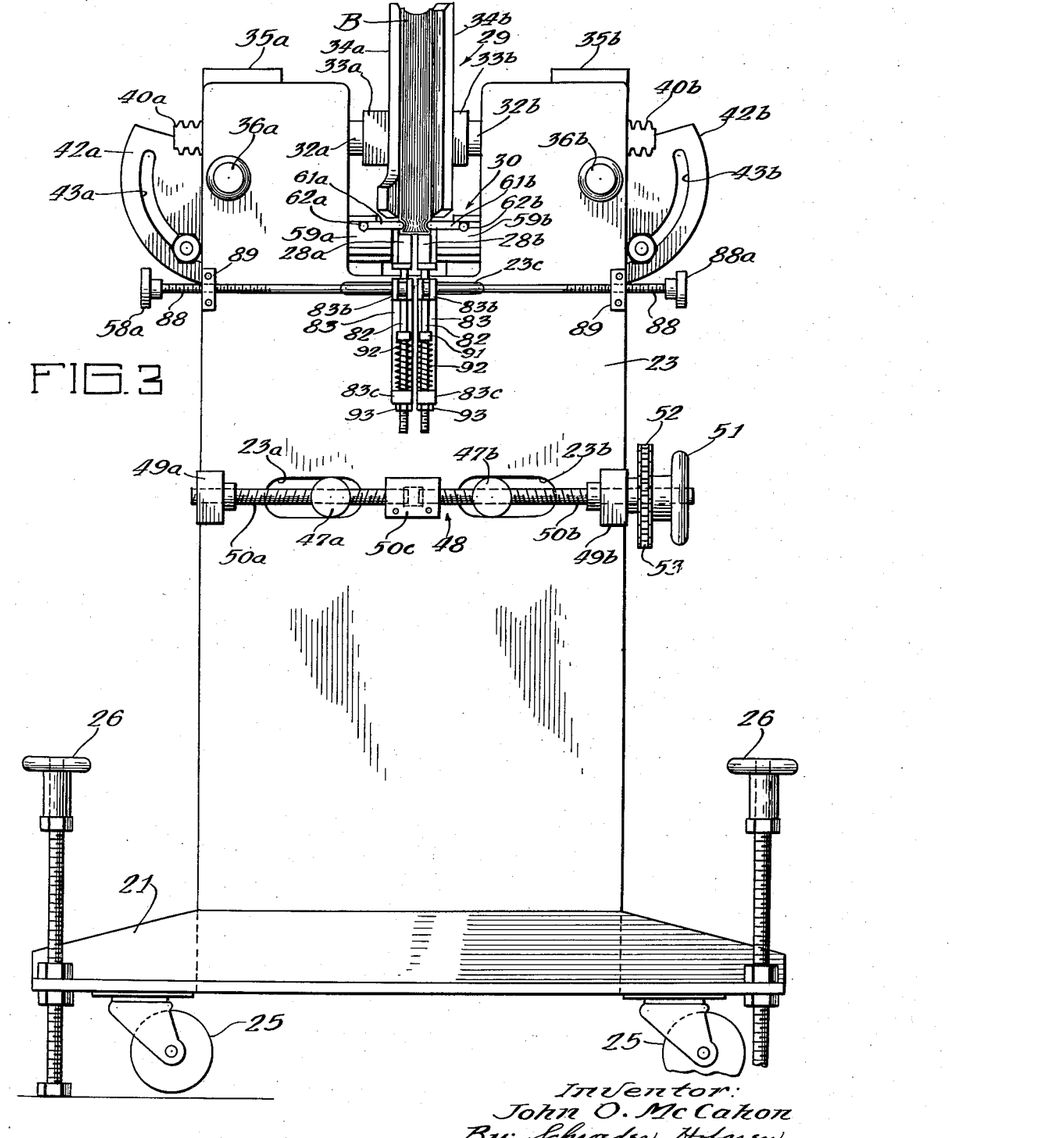
Fig. 3 is an end elevational view of the machine with the irons in pressing position.
Figure 4:
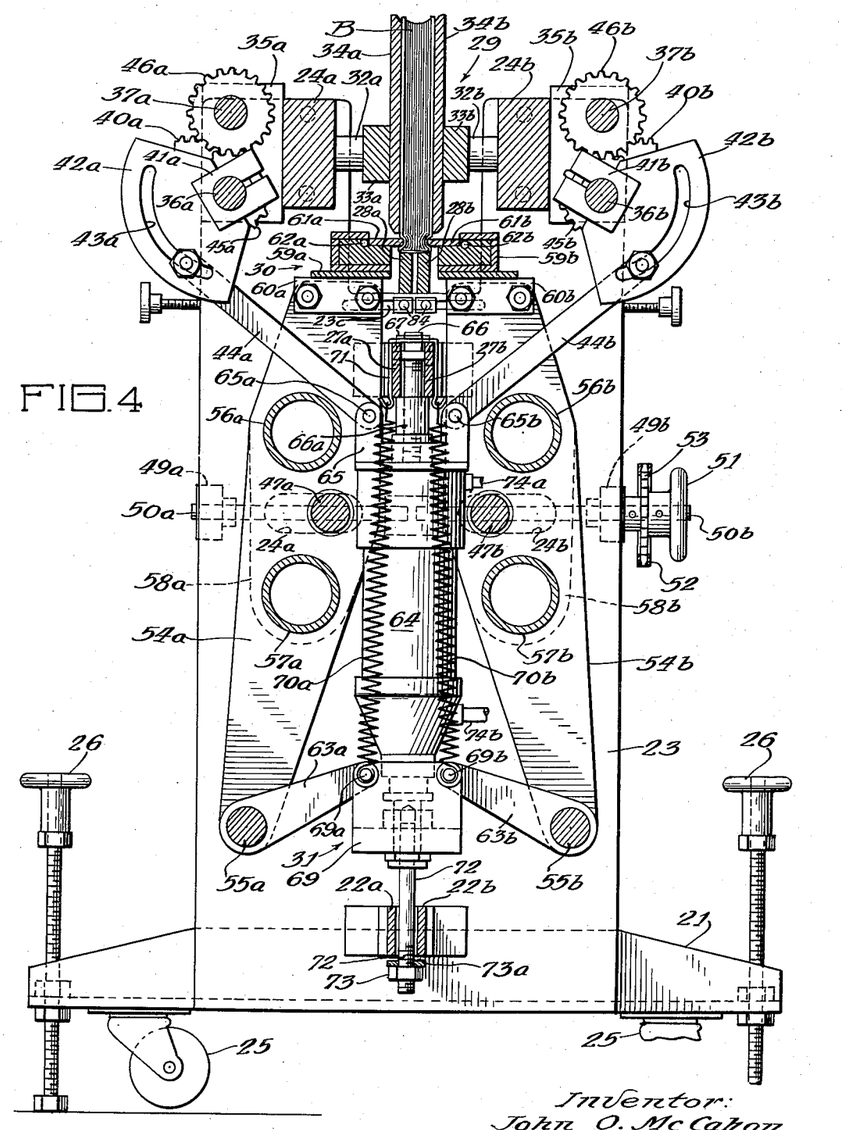
Fig. 4 is a section taken as indicated along the line 4—4 of Fig. 1, with the irons in pressing position.

The operating components of the machine consist generally of a case pressing iron mechanism indicated generally at 29, a hinge jointing iron mechanism indicated generally at 30, and a hydraulic actuating mechanism indicated generally at 31. As best seen in Figs. 1, 2, 4, 8 and 9, the case pressing mechanism 29 includes three transverse slide bars 32a which are mounted in complementary bores in the upper longitudinal frame members 24a, and three slide bars 32b are in the frame member 24b, aligned with the bars 32a. On the inner adjacent ends of the slide bars 32a and 32b are longitudinal presser iron support bars 33a and 33b, respectively, on which are upright, parallel case pressing irons 34a and 34b which are positioned above, and flanking the book guide and support rails 28a and 28b. As seen in Fig. 2, the case pressing iron 34a extends further toward the left hand, or book entry end of the machine; while the pressing iron 34b is shorter, and flares outwardly so that an operator may readily guide a book between the pressing irons on the book supporting and guide rails 28a and 28b. As seen in Figs. 3 and 4, the case pressing irons 34a and 34b are wide enough from top to bottom to press the entire cover areas of books on the guide rails, leaving the hinge areas exposed.

Figure 8:
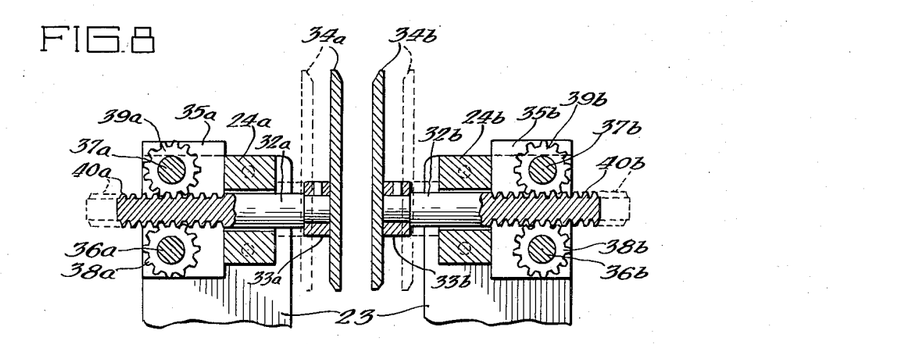
Fig. 8 is a fragmentary section on an enlarged scale taken as indicated along the line 8—8 of Fig. 2, with the most open adjusted position of the pressing plates in broken lines.
Figure 9:
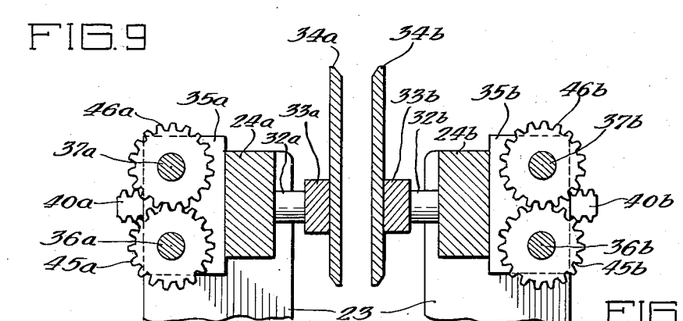
Fig. 9 is a fragmentary section on an enlarged scale taken as indicated along the line 9—9 of Fig. 2.

Extending outwardly from the upper longitudinal frame members 24a and 24b are longitudinally spaced brackets numbered 35a and 35b, respectively, which are provided with suitable bushings to rotatably support lower gear shafts 36a and 36b, and upper gear shafts 37a and 37b, the lower gear shafts being also supported in bushings in the end frame members 23. As best seen in Figs. 1, 2 and 8, the shafts 36a and b are provided, respectively, with three sets of drive gears 38a and 38b, while the gear shafts 37a and 37b are provided with three sets of drive gears 39a and 39b; and the gears 38a and 39a mesh with gear racks 40a on the sliding shafts 32a, while the gears 38b and 39b mesh with similar racks 40b on the sliding shafts 32b. Thus, rotation of the shafts 36a—37a and 36b—37b act through the gears on those shafts to reciprocate the sliding shafts 32a and 32b which moves the case pressing irons 34a and 34b between retracted positions and pressing positions.

In their retracted positions the pressing irons are very close to the case of a book B which is supported on the rails 28a and b, so that the irons hold the book in upright position. Normal clearance between the irons and a book is about ⅛ inch total clearance.

As best seen in Figs. 1, 2 and 4, close to the longitudinal mid-points of the gear shafts 36a and 36b are clamping blocks 41a and 41b on which are supported, respectively, actuating crank plates 42a and 42b which are provided with arcuate slots 43a and 43b, respectively, to adjustably receive the upper ends of actuating links 44a and 44b. The lower ends of the actuating links 44a and 44b are secured to the pneumatic actuating mechanism 31 so that actuation of the mechanism moves the links to rotate the shafts 36a and 36b, and this rotational movement is transmitted by gears 45a and 45b on the shafts 36a and 36b to gears 46a and 46b on the shafts 37a and 37b, respectively (see Fig. 9). It is obvious that the positions of the upper ends of the links 44a and 44b in the slots 43a and 43b determines the positions which will be occupied by the case pressing plates 34a and 34b at the extremities of their movements. The widest setting of the pressing plates is shown in broken lines in Fig. 8.

The joint forming iron mechanism 30 consists of a pair of longitudinal supporting shafts 47a and 47b which, as best seen in Fig. 3, are mounted for lateral adjustment in suitable slots 23a and 23b in the end frame members 23. Lateral adjustment of the shafts 47a and 47b is accomplished by means of an adjusting mechanism, indicated generally at 48, which includes suitable fixed bearing brackets 49a and 49b at the two margins of the end frame members 23 in which are rotatably mounted, respectively, a left hand threaded adjusting screw 50a and a right hand threaded adjusting screw 50b which are connected at their inner ends by a clamping member 50c. The left hand threaded screw 50a goes through a complementarily threaded opening in the shaft 47a, while the right hand threaded screw 50b goes through a similar opening in the shaft 47b so that movement of a hand wheel 51 turns the screws 50a and 50b to move the shafts 47a and 47b toward each other or away from each other. As seen in Fig. 1, there are similar adjusting mechanisms 48 at both ends of the machine, and they are connected by a roller chain 52 which is trained over sprockets 53 so that the shafts 47a and 47b always are parallel and may be adjusted from either end of the machine.

As best seen in Figs. 1 and 4, rockably supported upon the shaft 47a is a pair of spaced upright toggle link members 54a, while rockably mounted on the shaft 47b is a similar pair of toggle link members 54b, and a longitudinal toggle pivot 55a connects the links 54a, while a similar toggle pivot 55b connects the links 54b. Mounted in the toggle links 54a and extending longitudinally beyond both said links are upper and lower supporting pipes 56a and 57a, while mounted in the toggle links 54b are similar supporting pipes 56b and 57b. Mounted adjacent the extremities of said pipes are upright mounting brackets numbered 58a on the pipes 56a—57a, and 58b on the pipes 56b—57b. A joint forming iron 59a is provided with brackets 60a by means of which it is secured to the upper ends of the toggle links 54a and the upright brackets 58a, while a joint forming iron 59b is provided with fastening brackets 60b by means of which it is fastened to the upper ends of the toggle links 54b and the upright brackets 58b. As best seen in Fig. 4, the joint forming irons 59a and 59b are provided, respectively, with joint forming jaws 61a and 61b which are heated by suitable electric heating coils 62a and 62b, respectively. As seen in Fig. 1, one of the fastening brackets 60a or 60b for a joint forming iron is rigidly secured to one of the upright brackets 58a or 58b, as the case may be; while the other fastening brackets 60a or 60b are resiliently mounted to avoid the necessity for holding close tolerances between the positions of the fastening brackets and the positions of the toggle links and upright mounting brackets. As seen in Figs. 1 and 4, the toggle pivot 55a which connects the upright toggle links 54a serves as pivot for a pair of toggle actuating links 63a which are connected at their other ends to the pneumatic operating mechanism 31, while the upright toggle links 54b are similarly provided with toggle actuating links 63b which are also connected to the pneumatic operating mechanism 31.

It is obvious from the description of the toggle linkages and the positioning of the joint forming irons on top of the toggle links 54a and 54b that lateral adjustment of the mounting shafts 47a and 47b for the toggle linkages by means of the adjusting mechanism 48 changes the positions of the forming iron jaws 61a and 61b to adapt the device to books of different thicknesses.

As seen in Figs. 1 and 4, the pneumatic actuating mechanism 31 includes a double acting air cylinder 64 which is provided at its upper end with a bracket 65 having an upwardly extending threaded stud 66 to receive a mounting nut 67 which engages the margins of a pair of centrally positioned recesses in the longitudinal intermediate frame members 27a and 27b. The bracket 65 is provided with pivot pins 65a and 65b to which the inner ends of the actuating links 44a and 44b, respectively, are secured. Thus, the vertical position of the cylinder 64 in the mechanism may be adjusted by moving the supporting nut 67 on the stud 66.

The air cylinder 64 is provided at its lower end with a piston 68 which includes a downwardly extending piston rod on which is a bifurcated bracket 69 through which extends a pair of pins 69a and 69b to which are connected, respectively, the inner ends of the toggle actuating links 63a and 63b. As best seen in Fig. 1, the pins 69a and 69b extend longitudinally beyond the ends of the bracket 69, and a pair of tension springs 70a extend upwardly from the ends of the pin 69a to one arm of a pair of U-shaped spring brackets 71 which are hung on the intermediate supporting frame members 27a and 27b, while similar tension springs 70b extend from the projecting end portions of the pin 69b upwardly to the opposite ends of said spring brackets 71. Below the bifurcated bracket 69 the piston rod of piston 68 extends between the lower longitudinal frame members 22a, and 22b and is threaded as seen at 72 to receive a nut 73 and washer 73a which bears against the under sides of said frame members when the piston is retracted.

It is clear from the foregoing description of the pneumatic operating mechanism 31 that the cylinder 64 and piston 68 with its piston rod are floatingly mounted between the intermediate longitudinal frame members 27a—27b and the lower longitudinal frame members 22a—22b, and that the tension springs 70a and 70b ordinarily act to retract the piston 68 in the cylinder 64.

The air cylinder 64 is provided with suitable nipples to receive air supply lines 74a and 74b which supply air, respectively, to extend and retract the piston 68; and said air supply lines are seen in Fig. 1 to connect with a conventional air control valve 75 which is preferably positioned loose on the floor adjacent the frame 20. The valve 75 is a commercially available unit having a time control mechanism so that when an operator steps on a valve actuating pedal 75a it sets the valve to admit air through the line 74a to the upper end of hydraulic cylinder 64, and the supply to line 74a is kept open by a timing mechanism even after the operator removes his foot from the valve pedal 75a. Thus, air is admitted to the cylinder 64 to actuate the case pressing and joint forming irons, and the pressure remains on for a predetermined length of time which is established by the setting of the timing mechanism in the valve 75. At the end of the predetermined time interval, the timing mechanism reverses the valve to feed air to the cylinder 64 through the return air supply line 74b.

In the actuation of the device, the tension springs 70a and 70b are of such strength that they prevent the piston 68 from moving downwardly when air is admitted to the cylinder, so that upon actuation the cylinder 64 first moves upwardly, pushing up the actuating links 44a and 44b so as to rotate the shafts 36a and 36b and 37a—37b which act through the racks 40a and 40b to move the case pressing irons 34a and 34b firmly into pressing contact with the case of the book B which is supported upon the book guide and support rails 28.

The cylinder 64 moves up until a stop sleeve 66a on stud 66 strikes the undersides of the intermediate frame members 27a and 27b, as seen in Fig. 4, after which the piston 68 moves downwardly, pushing the washer 73a down from the bottom frame members 22a—b, as seen in Fig. 4, and straightening out the toggle actuating links 63a and 63b with respect to the upright toggle links 54a and 54b at the toggle pivots 55a and 55b. This rocks the upright toggle links about their supporting shafts 47a and 47b and moves the jointing jaws 61a and 61b laterally toward each other and into firm joint forming, pressing engagement with the hinge areas of the book B immediately beneath the area covered by the pressing irons 34a and 34b. At the end of the predetermined time interval, the operation of the valve mechanism 75 reverses the movement of the piston 68 in the cylinder 64, retracting the pressing irons and jointing irons. The operator may then place another book B between the irons and repeat the operation. In normal use of the machine, the operator stands near the infeed, or left end of the machine as seen in Figs. 1 and 2, and feeds books one at a time between the irons, with each book pushing the book ahead of it further into the machine. Thus, depending upon the size of the books B each book receives a certain number of forming operations as it is advanced stepwise by the addition of new books at the infeed end, and ultimately each book is pushed out at the outfeed end of the machine where it may drop onto a conveyor or may be manually removed for transportation to a packing room.

Figure 10:
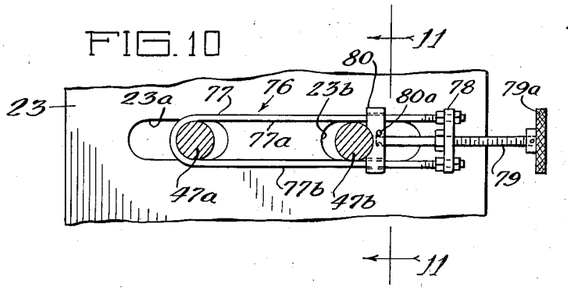
Fig. 10 is a fragmentary section on an enlarged scale taken as indicated along the line 10—10 of Fig. 1.
Figure 11:
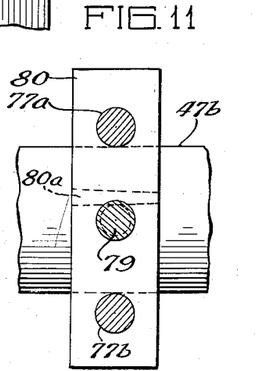
Fig. 11 is a fragmentary section taken as indicated along the line 11—11 of Fig. 10.

Operation of the toggle links 54a and 54b throws a tremendous transverse pressure upon the shafts 47a and 47b upon which the links are mounted, and accordingly the shafts are provided adjacent each end with a pair of bracing means, indicated generally at 76 and best seen in Figs. 10 and 11. Bracing means 76 consists of a long U-bolt 77 which is positioned with its arms 77a and 77b embracing the shafts 47a and 47b, and an adjustable cross bar 78 secured to the arms of the U-bolt has a central threaded aperture to receive an adjusting screw 79 which is provided with a hand wheel 79a. At the inner end of the adjusting screw 79 is a thrust plate 80 which is secured to the screw by means of a taper pin 80a, and the thrust plate 80 may be forced against the shaft 47b with any desired amount of pressure to maintain the shafts 47a and b in parallelism.

Adjustment of the case pressing irons 34a and 34b, and of the joint forming irons 59a and 59b has previously been described. There is one additional adjustment which is necessary to accommodate the machine to books of different sizes, and this is the adjustment of the book supporting rails 28a and 28b both horizontally and vertically. Proper support of the books requires that the spacing between the supporting and guiding rails 28a and 28b be suitably adjusted to the particular books, and also the distance from the guide rails to the joint forming jaws 61a and 61b must be accurately adjusted so as to get the hinge joints in the proper places.

Figures 5, 6, 7:
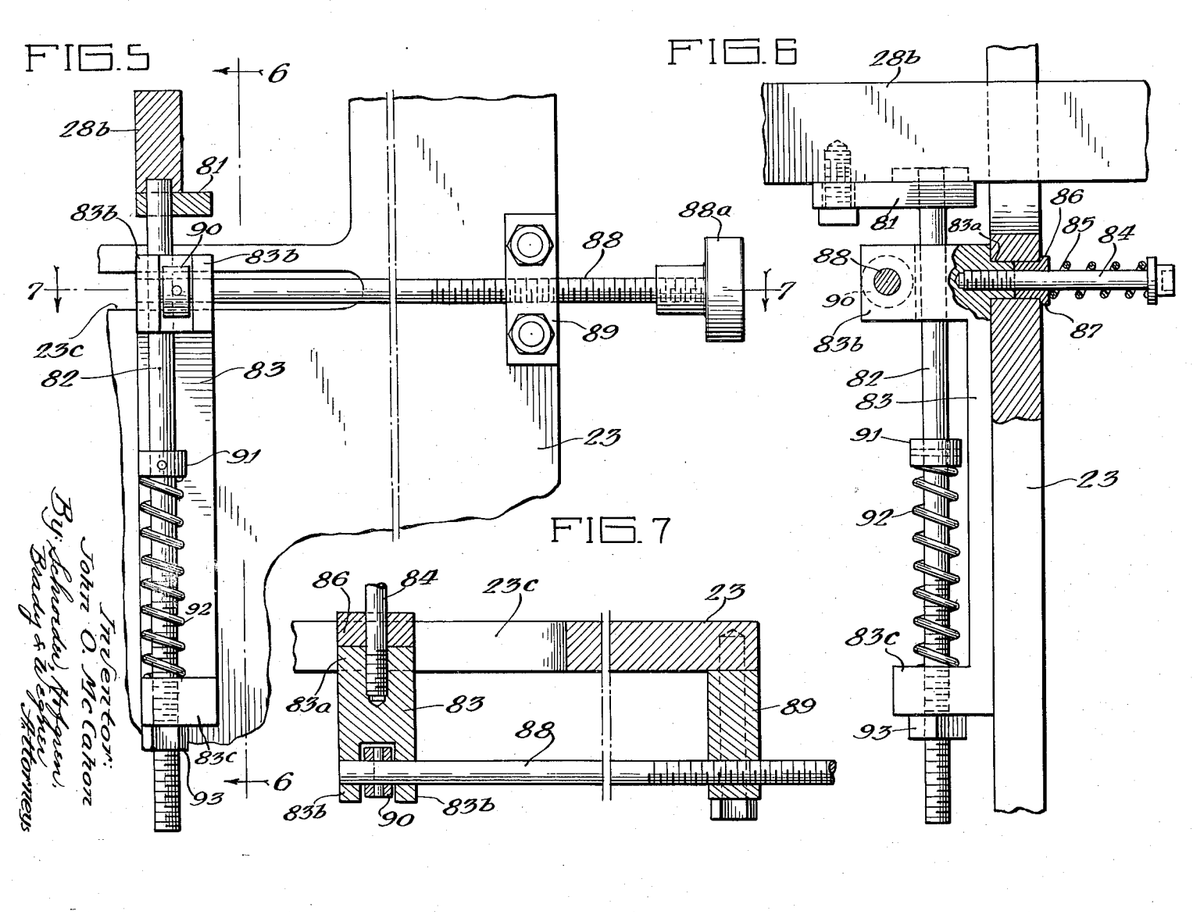
Fig. 5 is a fragmentary end elevational view on an enlarged scale and partly in section, showing the adjusting mechanism for one of the book guiding and supporting rails.
Fig. 6 is a fragmentary section taken as indicated along the line 6—6 of Fig. 5.
Fig. 7 is a fragmentary section as indicated along the line 7—7 of Fig. 5.

The adjusting mechanism for the book support and guide rails 28a and 28b is best seen in Figs. 5 and 6, which shows only the adjustment for the rail 28b. The two rails are independently adjusted by identical mechanisms. As best seen in Figs. 3 and 5–7, the book supporting and guide rail 28b is secured to a pair of brackets 81 at the upper ends of a pair of vertical adjusting screws 82 which extend through aligned upright openings in a bifurcated bracket 83 which is mounted for lateral adjustment in the end frame 23. There are identical brackets 81 and bifurcated brackets 83 on both of the end frame members 23 for the book supporting and guiding rail 28b, and a similar arrangement for the book supporting and guiding rail 28a. The upper arm of the bifurcated brackets 83 has an outward extension 83a which engages a transverse slot 23c in the end frame member 23, and the outward extension 83a is threaded to receive a fastening bolt 84 around which is a compression spring 85 the inner end of which bears against a slide member 86 which has a shoulder 87 abutting the end frame member 23 at the margins of the slot 23c. Thus, the bifurcated bracket 83 may be moved transversely with respect to the end frame member 23 by sliding along the slot 23c; and such motion may be imparted to the bracket by means of a transverse adjusting screw 88 which is threaded in a bracket 89 on the end frame member 23 and has a hand wheel 88a by means of which it may be easily turned. At its inner end the adjusting screw 88 is provided with an engaging ring 90 which lies between a pair of thrust lugs 83b on the bifurcated bracket 83.

For vertical adjustment of the book supporting and guiding rail 28b with respect to the bifurcated bracket 83, the vertical screw 82 is provided with a spring collar stop 91 which confines a tension spring 92 against the lower arm 83c of the bifurcated bracket 83, and an adjusting nut 93 on the lower end of the screw 82 permits vertical adjustment of the book supporting and guiding rail 28b.

The foregoing detailed description is given for clearness of understanding only and no unnecessary limitations are to be understood therefrom, for variations will be obvious to those skilled in the art.

I claim:

1. A machine for simultaneously pressing cased books and forming joints in the hinge areas thereof, comprising: a frame; a pair of parallel, horizontal book support rails extending longitudinally of said frame to support cased books end to end in an upright position; adjustable mounting bracket means for said book support means to vary the space between said rails and the vertical position of said rails with respect to the frame; a pair of horizontally reciprocable parallel elongated case pressing irons flanking books on said support rails, said pressing irons having a retracted position in which they retain books loosely in upright position; pressing linkage means operatively connected to said pressing irons to move the irons between said retracted position and a case pressing position; means for adjusting the connection between said pressing linkage means and the pressing irons to vary the space between said irons in said retracted position; a pair of horizontally reciprocable parallel elongated jointing irons flanking the hinge areas of books on said support means; jointing linkage means operatively connected to said jointing irons to move said jointing irons between a retracted position and a joint pressing position; means for adjusting the positions of said jointing linkage means to vary the space between said jointing irons in said retracted positions independently of the adjustment of said pressing irons; and sequential actuating means for moving first said pressing irons and then said jointing irons into pressing position and for retracting first said jointing and then said pressing irons, whereby the pressing irons hold the books firmly during movement of the jointing irons.

2. A machine for simultaneously pressing cased books and forming joints in the hinge areas thereof, comprising: a frame; horizontal book support means on said frame adapted to support cased books end to end in an upright position; a pair of horizontally reciprocable parallel case pressing irons flanking books on said support means, said pressing irons having a retracted position in which they retain books in upright position; a pair of horizontally reciprocable parallel jointing irons flanking the hinge areas of books on said support means; a fluid cylinder and piston floatingly mounted on the frame so that the cylinder and piston may move in opposite directions; pressing linkage means operatively connecting the cylinder with the case pressing irons; jointing linking means operatively connecting the piston with the jointing irons; valve means for selectively admitting fluid to said cylinder to cause relative outward movement of the piston and cylinder; and piston control means connecting the piston to the frame, said control means being adapted to retain the piston in a fixed position until movement of the cylinder, acting through the pressing linkage means, has placed a predetermined minimum pressure on a cased book positioned between the pressing irons.

3. The device of claim 2 in which the piston control means includes tension spring means connecting the piston to the frame, the force required to extend said spring means being substantially greater than the force required to move the cylinder and press the book between the pressing irons.

4. A machine for simultaneously pressing cased books and forming joints in the hinge areas thereof, comprising: a frame; horizontal book support means on said frame adapted to support cased books end to end in an upright position; a pair of horizontally reciprocable parallel case pressing irons flanking books on said support means, said pressing irons having a retracted position in which they retain books in an upright position; a pair of parallel jointing irons flanking the hinge areas of books on said support means, said jointing irons being reciprocable between a retracted position and a joint pressing position; a fluid cylinder and piston floatingly suspended from said frame in upright position beneath the book support means; linkage means connecting the cylinder with the pressing irons; toggle linkage means connecting the piston with the jointing irons; valve means for selectively admitting fluid to said cylinder to cause relative outward movement of the piston and cylinder; and piston control means connecting the piston to the frame, said control means being adapted to retain the piston in a fixed position until upward movement of the cylinder with respect to the frame, acting through the pressing linkage means, has placed a predetermined minimum pressure on a cased book positioned between the pressing irons, the piston being movable after said predetermined pressure has been reached to straighten said toggle linkage means and move the jointing irons to joint pressing position.

5. A machine for simultaneously pressing cased books and forming joints in the hinge areas thereof, comprising: a frame; horizontal book support means on said frame adapted to support cased books end to end in an upright position; a pair of parallel case pressing irons flanking books on said support means, said pressing irons being mounted on horizontal rack bars for movement between a retracted position in which they retain books loosely in upright positon, and a case pressing position; a plurality of parallel longitudinal shafts supported in said frame, said shafts having actuating gears in meshing engagement with said rack bars; crank arms on said shafts for rotating the shafts; a pressing actuating link connected to each of said crank arms; means for adjusting the connection between said crank arms and said links; a pair of laterally spaced upright toggle link members pivotally mounted in the frame; a pair of opposed jointing irons surmounting said toggle link members and flanking the hinge areas of books on said support means so as to be moved by pivoting of said toggle link members between retracted positions and joint pressing positions; toggle actuating links pivotally connected to said toggle link members; means for adjusting the space between the toggle link members; and sequential actuating means operatively connected to said pressing actuating links and to said toggle actuating links for moving first said pressing irons and then said jointing irons into pressing position and for retracting first said jointing irons and then said pressing irons, whereby the pressing irons hold the books firmly during movement of the jointing irons.

6. A machine for simultaneously pressing cased books and forming joints in the hinge areas thereof, comprising: a frame; horizontal book support means on said frame adapted to support a plurality of cased books end to end with their spines downward; a pair of case pressing irons, said pressing irons being slidably mounted in the frame for reciprocation between a retracted position in which they retain books loosely in upright position, and a case pressing position; a pair of longitudinal rock shafts flanking said pressing irons; a plurality of rack and gear means on said rock shafts operatively connected to spaced points on each of said pressing irons to reciprocate the pressing irons; a pair of toggle shafts mounted in said frame; an upright toggle link member pivoted on each toggle shaft, each said member including a pair of longitudinally spaced toggle links and rigid connector pieces extending through said links; upright bracket members secured to said connector pieces adjacent the ends of the frame; a pair of elongated jointing irons surmounting said toggle links and bracket members, flanking the hinge areas of books on said support means; an upright fluid cylinder and piston floatingly mounted at the center of said frame; a pair of pressing actuating links operatively connecting the cylinder with the rack and gear means for reciprocating said pressing irons; a pair of toggle actuating links operatively connecting the piston with the upright toggle links; valve means for selectively admitting fluid to said cylinder to cause relative outward movement of the piston and cylinder; and piston control tension spring means connecting the piston to the frame, the force required to extend said tension spring means being substantially greater than the force required to move the cylinder and close the pressing irons on a book.

7. The device of claim 6 which includes a plurality of U-bolts connecting the spaced toggle shafts, and adjustable pressure plate means on each of said U-bolts for maintaining the parallel relationship of said shafts against the outward thrust of the toggle link members.

8. In a machine adapted to perform two separate, sequential pressing operations on spaced parts of a cased book: a frame adapted to support a cased book in upright position; a fluid cylinder and piston floatingly mounted on the frame so that the cylinder and piston may move in opposite directions; first pressing means movably mounted on the frame in alignment with one portion of a cased book supported in the frame; actuating means operatively connecting said first pressing means to the cylinder; second pressing means movably mounted on the frame in alignment with a second portion of a cased book supported in said frame; operating means connecting said second pressing means to the piston; valve means for selectively admitting fluid to the cylinder; and piston control means connecting the piston to the frame, said control means being adapted to retain the piston in a fixed position until movement of the cylinder, acting through the first pressing means, has placed a predetermined pressure on said first portion of the book supported in the frame, the piston being movable after said predetermined pressure has been reached to move the second pressing means into pressing engagement with the book.

9. The machine of claim 8 in which the piston control means includes tension spring means connecting the piston to the frame, the force required to extend said spring means being substantially greater than the force required to move the cylinder and press the book between the pressing irons, and stop means to arrest the movement of the cylinder.

10. A machine for simultaneously pressing cased books and forming joints in the hinge areas thereof, comprising: a frame; horizontal book support means on said frame adapted to support a plurality of cased books end to end with their spines downward; a pair of case pressing irons, said pressing irons being slidably mounted in the frame for reciprocation between a retracted position in which they retain books loosely in upright position, and a case pressing position; a pair of longitudinal rock shafts flanking said pressing irons; a plurality of rack and gear means on said rock shafts operatively connected to spaced points on each of said pressing irons to reciprocate the pressing irons; a pair of toggle shafts mounted in said frame; an upright toggle link member pivoted on each toggle shaft, each said member including a pair of longitudinally spaced toggle links and rigid connector pieces extending through said links; upright bracket members secured to said connector pieces adjacent the ends of the frame; a pair of jointing irons surmounting said toggle links and bracket members flanking the hinge areas of books on said support means; a pair of pressing actuating links operatively connected with the central portions of the rock shafts; a pair of toggle actuating links operatively connected with the upright toggle links; and actuating means positioned centrally of the frame and operatively connected to both said pairs of actuating links for moving first said pressing irons and then said jointing irons into pressing position and for retracting said irons.

11. A machine for simultaneously pressing cased books and forming joints in the hinge areas thereof, comprising: a frame; horizontal book support means on said frame adapted to support cased books end to end in an upright position; a pair of parallel case pressing irons flanking books on said support means, said pressing irons being mounted on horizontal rack bars for movement between a retracted position in which they retain books loosely in upright position, and a case pressing position; a plurality of parallel longitudinal shafts supported in said frame, said shafts having actuating gears in meshing engagement with said rack bars; crank arms on said shafts for rotating the shafts; a pressing actuating link connected to each of said crank arms; means for adjusting the connection between said crank arms and said links; a pair of laterally spaced upright toggle link members pivotally mounted in the frame; a pair of opposed jointing irons surmounting said toggle link members and flanking the hinge areas of books on said support means so as to be moved by pivoting of said toggle link members between retracted positions and joint pressing positions; toggle actuating links pivotally connected to said toggle link members; means for adjusting the space between the toggle link members; and actuating means operatively connected to said pressing actuating links and to said toggle actuating links for reciprocating both said sets of irons independently between their retracted and pressing positions.

12. A machine for simultaneously pressing cased books and forming joints in the hinge areas thereof while the books are at rest, comprising: a frame; horizontal book support means on said frame adapted to support several cased books end to end in an upright position; a pair of longitudinally fixed parallel, elongated case pressing irons extending the length of the frame flanking books on said support means, said irons being of sufficient width to cover the entire case areas of books on the support means, both said pressing irons being laterally reciprocable between a retracted position in which they retain books loosely in upright position and a case pressing position compressing said books to iron the cases; a pair of longitudinally fixed, parallel elongated jointing irons extending the length of the frame flanking the hinge areas of books on said support means and independent of said pressing irons, said jointing irons being laterally reciprocable between a retracted position and a case engaging jointing position; pressing linkage means operatively connected to said pressing irons to move both the irons between said retracted position and said pressing position; jointing linkage means operatively connected to said jointing irons to move both said jointing irons between said retracted position and said jointing position; and sequential actuating means operatively connected to both said linkage means for moving first said pressing irons and then said jointing irons into case engaging position and for retracting first said jointing and then said pressing irons, whereby the pressing irons hold the books firmly during operation of the jointing irons.

13. A machine for simultaneously pressing cased books and forming joints in the hinge areas thereof while the books are at rest, comprising: a frame; a pair of parallel, horizontal book support members extending longitudinally of said frame to support several cased books end to end in an upright position; adjustable mounting bracket means for said book support means to vary the space between said members and the vertical position of said members with respect to the frame; a pair of longitudinally fixed, parallel, elongated case pressing irons extending the length of the frame flanking books on said support members, said irons being of sufficient width to cover the entire case areas of books on the support members, said pressing irons being laterally reciprocable between a retracted position in which they retain books loosely in upright position and a case pressing position compressing said books to iron the cases; pressing linkage means operatively connected to said pressing irons to move the irons between said retracted position and said pressing position; means for adjusting the connection between said pressing linkage means and the pressing irons to vary the space between said irons in said retracted position; a pair of longitudinally fixed, parallel, elongated jointing irons flanking the hinge areas of books on said support means, said jointing irons being laterally reciprocable between a retracted position and a case engaging, jointing position; jointing linkage means operatively connected to said jointing irons to move said jointing irons between said retracted position and said jointing position; means for adjusting the positions of said jointing linkage means to vary the space between said jointing irons in said retracted positions independently of the adjustment of said pressing irons; and actuating means operatively connected to said pressing linkage means and to said jointing linkage means for reciprocating both said sets of irons independently in timed relationship between their retracted and pressing positions.

14. A machine for simultaneously pressing cased books and forming joints in the hinge areas thereof, comprising: a frame; horizontal book support means on said frame adapted to support several cased books end to end in an upright position; a pair of longitudinally fixed parallel, elongated case pressing irons extending the length of the frame flanking books on said support means, said irons being of sufficient width to cover the entire case areas of books on the support means, both said pressing irons being laterally reciprocable between a retracted position in which they retain books loosely in upright position and a case pressing position compressing said books so that an operator may manually slide books endwise onto said support means between said retracted pressing irons, each book pushing the others on the support means ahead of it; a pair of longitudinally fixed, parallel elongated jointing irons extending the length of the frame flanking the hinge areas of books on said support means, said jointing irons being laterally reciprocable between a retracted position and a case engaging jointing position; pressing linkage means operatively connected to said pressing irons to move both the irons between said retracted position and said pressing position; jointing linkage means operatively connected to said jointing irons to move both said jointing irons between said retracted position and said jointing position; actuating means operatively connected to both said linkage means for reciprocating both said sets of irons independently in timed relationship between their retracted and pressing positions; and foot pedal control means for said actuating means adjacent an end of the frame, whereby an operator sliding books onto the support means may control the operation of said irons.

15. A machine for simultaneously pressing cased books and forming joints in the hinge areas thereof, comprising: a frame; horizontal book support means on said frame adapted to support several cased books end to end in an upright position; a pair of longitudinally fixed parallel, elongated case pressing irons extending the length of the frame flanking books on said support means, said irons being of sufficient width to cover the entire case areas of books on the support means, both said pressing irons being laterally reciprocable between a retracted position in which they retain books loosely in upright position and a case pressing position compressing said books so that an operator may manually slide books endwise onto said support means between said retracted pressing irons, each book pushing the others on the support means ahead of it; a pair of longitudinally fixed, parallel elongated jointing irons extending the length of the frame flanking the hinge areas of books on said support means, said jointing irons being laterally reciprocable between a retracted position and a case engaging jointing position; pressing linkage means operatively connected to said pressing irons to move both the irons between said retracted position and said pressing position; jointing linkage means operatively connected to said jointing irons to move both said jointing irons between said retracted position and said jointing position; sequential actuating means operatively connected to both said linkage means for moving first said pressing irons and then said jointing irons into case engaging position and for retracting first said jointing and then said pressing irons, whereby the pressing irons hold the books firmly during movement of the jointing irons; and foot pedal control means for said actuating means adjacent an end of the frame, whereby an operator sliding books onto the support means may initiate said sequential actuation of the irons.

References Cited in the file of this patent
UNITED STATES PATENTS

| | | |
|---|---|---|
| 2,083,720 | Lariviere | June 15, 1937 |
| 2,151,957 | Davis | Mar. 28, 1939 |
| 2,151,991 | Schramm | Mar. 28, 1939 |
| 2,635,262 | Schramm | Apr. 21, 1953 |
| 2,636,195 | Hicks et al. | Apr. 28, 1953 |
| 2,714,732 | Traettino | Aug. 9, 1955 |
| 2,853,725 | Schoenberger | Sept. 30, 1958 |